United States Patent
Toyosaka

(10) Patent No.: US 10,576,914 B2
(45) Date of Patent: Mar. 3, 2020

(54) PROTECTOR FOR WIRE HARNESS

(71) Applicant: SUMITOMO WIRING SYSTEMS, LTD., Mie (JP)

(72) Inventor: Ayaka Toyosaka, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 16/061,904

(22) PCT Filed: Dec. 7, 2016

(86) PCT No.: PCT/JP2016/086350
§ 371 (c)(1),
(2) Date: Jun. 13, 2018

(87) PCT Pub. No.: WO2017/110471
PCT Pub. Date: Jun. 29, 2017

(65) Prior Publication Data
US 2018/0361959 A1    Dec. 20, 2018

(30) Foreign Application Priority Data
Dec. 22, 2015    (JP) ................................ 2015-250340

(51) Int. Cl.
*B60R 16/02*    (2006.01)
*H02G 3/04*    (2006.01)

(52) U.S. Cl.
CPC ....... *B60R 16/0215* (2013.01); *H02G 3/0418* (2013.01); *H02G 3/0437* (2013.01); *H02G 3/0487* (2013.01); *H02G 3/045* (2013.01)

(58) Field of Classification Search
None
See application file for complete search history.

(56) References Cited

U.S. PATENT DOCUMENTS

| | | | | |
|---|---|---|---|---|
| 4,797,512 A | * | 1/1989 | Kumagai | ................ H02G 15/18 174/135 |
| 4,815,984 A | * | 3/1989 | Sugiyama | ........... B60R 16/0239 174/72 A |
| 4,822,956 A | * | 4/1989 | Sepe | .................... H01B 7/0045 174/103 |

(Continued)

FOREIGN PATENT DOCUMENTS

| | | |
|---|---|---|
| JP | 08-251754 | 9/1996 |
| JP | 2012-100460 | 5/2012 |

(Continued)

OTHER PUBLICATIONS

Espacenet. JP2012100460_English_Translation (Year: 2012).*
Official Communication issued in International Bureau of WIPO Patent Application No. PCT/JP2016/086350, dated Jan. 10, 2017.

*Primary Examiner* — Timothy J Thompson
*Assistant Examiner* — Muhammed Azam
(74) *Attorney, Agent, or Firm* — Greenblum & Bernstein, P.L.C.

(57) ABSTRACT

A protector having an insertion path of a branch wire which branches from a trunk wire of a wire harness where, when the branch wire is not inserted into the branch wire insertion path, the branch wire insertion path can be closed. The wire harness protector includes a closing plate provided integrally with the main body or retrofitted separately, when a branch wire may be present to be inserted through the branch wire insertion path, the branch wire being branched from a trunk wire of a wire harness inserted through the trunk wire insertion path, the closing plate closing a middle or an outlet of the branch wire insertion path, and the closing plate is pressed by the branch wire being inserted and has elasticity to be folded down or vulnerability to be torn.

7 Claims, 7 Drawing Sheets

(56) References Cited

U.S. PATENT DOCUMENTS

| | | | | |
|---|---|---|---|---|
| 5,293,501 A * | 3/1994 | Bennett | H01B 13/01263 | 138/128 |
| 5,315,062 A * | 5/1994 | Hoshino | H01R 13/506 | 174/72 C |
| 6,603,074 B2 * | 8/2003 | Seo | B60R 16/0215 | 174/102 D |
| 6,619,697 B2 * | 9/2003 | Griffioen | F16L 41/023 | 285/126.1 |
| 7,581,564 B2 * | 9/2009 | Tanaka | F16L 21/06 | 138/110 |
| 7,709,736 B2 * | 5/2010 | Irisawa | B60R 16/0215 | 174/135 |
| 8,575,487 B2 * | 11/2013 | Agusa | H02G 3/0487 | 174/68.3 |
| 10,418,797 B2 * | 9/2019 | Shitamichi | H02G 3/0418 | |
| 2008/0017397 A1 * | 1/2008 | Komiya | F16G 13/16 | 174/24 |
| 2009/0101406 A1 * | 4/2009 | Owen, Sr. | H02G 1/14 | 174/72 A |
| 2013/0118778 A1 * | 5/2013 | Takahashi | B60R 16/0215 | 174/154 |
| 2014/0102744 A1 * | 4/2014 | Suenaga | H02G 3/0418 | 174/50 |
| 2014/0144698 A1 * | 5/2014 | Sato | H02G 3/0481 | 174/72 A |
| 2014/0311796 A1 * | 10/2014 | Gannon | H01B 7/2825 | 174/72 A |
| 2015/0101842 A1 * | 4/2015 | Han | B60R 16/0222 | 174/50.57 |
| 2015/0279514 A1 * | 10/2015 | Sato | B60R 16/0207 | 174/72 A |
| 2015/0294768 A1 * | 10/2015 | Sakaki | B60R 16/0207 | 174/68.3 |
| 2016/0013625 A1 * | 1/2016 | Suzuki | B60R 16/0215 | 174/72 A |
| 2016/0156165 A1 * | 6/2016 | Katou | H01B 7/0045 | 174/72 A |
| 2016/0190782 A1 * | 6/2016 | Tsukamoto | H02G 3/0468 | 174/72 A |

FOREIGN PATENT DOCUMENTS

| | | | |
|---|---|---|---|
| JP | 2012100460 A | * | 5/2012 |
| JP | 2014-110722 | | 6/2014 |

\* cited by examiner

Fig. 1(A)
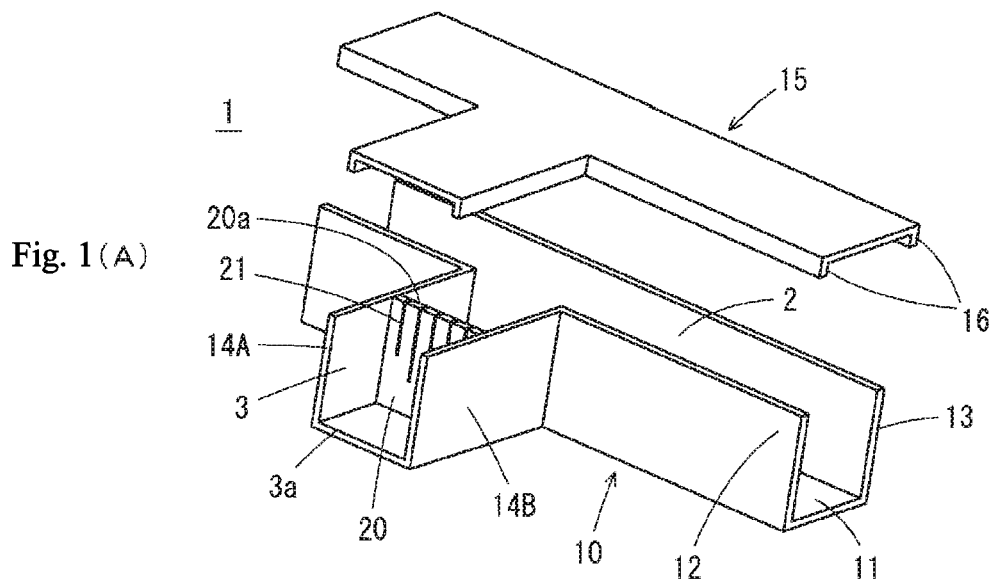
Fig. 1(B)
Fig. 2(A)
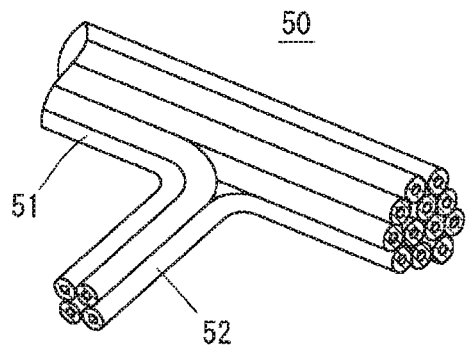
Fig. 2(B)
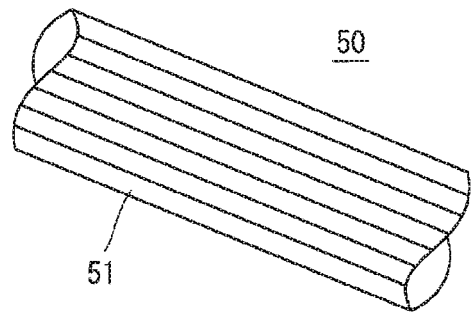

PRIOR ART
Fig. 10(A)
PRIOR ART
Fig. 10(B)
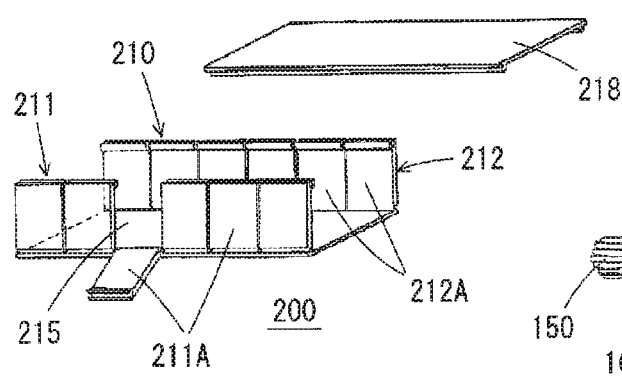
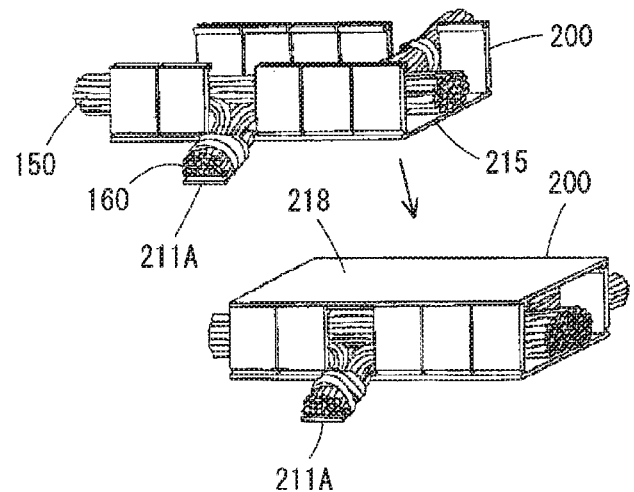

PROTECTOR FOR WIRE HARNESS

FIELD OF THE INVENTION

The prevent invention related to a protector for a wire harness, and particularly has a structure capable of accommodating the presence of a branch wire that branches from a trunk wire of a wire harness.

BACKGROUND OF THE INVENTION

A wire harness routed in a vehicle such as an automobile is sheathed by a molded resin protector in an area where a path must be regulated and where the wire harness must be protected. In a protector of this type, when there is a branch wire that branches from a trunk wire of a wire harness and the branch wire must be protected by the protector similar to the trunk wire, a protector 100 is provided with a trunk wire insertion portion 111 where a trunk wire 150 of the wire harness is inserted and with a branch wire insertion portion 112 where a branch wire 160 is inserted as illustrated in FIGS. 9 (A) and 9 (B).

In the wire harness sheathed by the protector 100, the branch wire 160 may not be branched from the trunk wire due to differences in vehicle type and grade, and the branch wire 160 may not be wired to the branch wire insertion portion 112 of the protector 100. In such a case, an outlet 112a of the branch wire insertion portion 112 is empty, and so foreign matter such as dust and water can easily enter inside the protector 100 and may have a negative influence on the trunk wire 150 which is inserted into the protector 100. In order to solve this issue, a protector without a branch portion for a branch wire may be provided separately. However, when another type of protector is provided based on the presence of the branch wire, the number of components increases, thus increasing costs.

Conventionally, in Japanese Patent Laid-open Publication No. H08-251754, the applicant provides a protector 200 as illustrated in FIGS. 10 (A) and 10 (B). The protector 200 is configured to be able to correspond to a design change of the wire harness, and is configured with both side walls 211 and 212 of a main body 210 divided into a plurality of side walls 211A and 212A. Each of these divided side walls 211A and 212A stands independently so as to be foldable outward from a bottom wall 215 and the side walls 211A and 212A which correspond to a location where the branch wire 160 branches from the trunk wire 150 of the wire harness are selected and folded outward and the branch wire 160 is extracted from the protector 200.

RELATED ART

Patent Literature

Patent Literature 1: Japanese Patent Laid-open Publication No. H08-251754

SUMMARY OF THE INVENTION

Problems to be Solved by the Invention

When the protector 200 illustrated in FIGS. 10 (A) and 10 (B) is used, it is not necessary to fold the side walls 211A and 212A outwardly in a case where there is no branch wire branched from the trunk wire. However, when the branch wire 160 is extracted by selecting and folding down the necessary side walls 211A and 212A, only a bottom surface of the branch wire 160 is supported by the lowered side wall so an entire circumference of the branch wire 160 is not protected. Therefore, the protector 200 cannot be applied when interference from outside members exists in the surrounding area. Moreover, in order to hold the plurality of divided side walls 211A and 212A of both side walls in standing positions, a lid 218 must be engaged with the side walls 211A and 212A, so there is an issue that work becomes troublesome and the structure is complicated. Furthermore, when a wire bundle is divided at an outlet side of the trunk wire insertion path and separated into the branch wire, for example, the protector 200 cannot be applied.

The present invention is conceived in light of the above-noted issues, and provides a protector that can prevent water exposure and entry of foreign matter from the outlet of the branch portion when a branch portion for the branch wire is provided by being branched from a main body portion for the trunk wire and there is no branch wire passing through the branch portion.

Means for Solving the Problems

In order to resolve the above-noted issues, a first invention provides a wire harness protector configured by a main body and a lid closing an upper opening of the main body, the main body being provided with a branch wire insertion path continuous from a trunk wire insertion path, and the trunk wire insertion path and the branch wire insertion path having side walls standing from two ends of a bottom wall in a width direction. The wire harness protector includes a closing plate provided integrally with the main body or retrofitted separately, when a branch wire may be present to be inserted through the branch wire insertion path, the branch wire being branched from a trunk wire of a wire harness inserted through the trunk wire insertion path, the closing plate closing a middle or the outlet of the branch wire insertion path; and the closing plate is pressed by the branch wire being inserted and has elasticity to be folded down or vulnerability to be torn.

Specifically, the closing plate is a rectangular flat plate that can fully close and transverse the branch wire insertion path and includes a plurality of downward notches from a top end of the closing plate. When divided pieces in a long strip shape divided by the notches are pressed down from above by the branch wire, each of the divided pieces is bent down so as to fall down from a base to enable the branch wire to be inserted.

Preferably, the divided pieces of the closing plate are formed by an elastic material made of elastomer or rubber to allow the divided pieces to be folded smoothly. Therefore, preferably, the main body and the lid are made of resin, the closing plate is made of elastomer or rubber, the closing plate provided in the middle of the branch wire insertion path is formed by a two-color molding, and the closing plate being retrofitted to the outlet of the branch wire insertion path is formed in a cap shape and externally mounted onto the outlet.

Preferably, the plurality of notches provided to the closing plate have the length of the notch be shorter near the side wall of two sides in the width direction of the branch wire insertion path, and the length of the notch becomes gradually longer toward a center in the width direction, to allow the notches be bent in an arc shape along the outline of the branch wire in a cross-section circular shape.

Instead of forming the closing plate by the elastic material such as elastomer, the closing plate is formed by a vulnerable resin film (such as a wrapping made of vinyl chloride and polyethylene) which is easily torn when pressed by the branch wire, the resin film covering the outlet of the branch wire insertion path so as to close the outlet, and both sides may be bonded onto external surfaces of the both side walls.

In the protector according to the present invention, the main body and the lid are provided separately. After passing the wire harness into the main body, the main body may be covered with the lid to lock-join, or the lid may be provided integrally, via a thin-walled hinge, on one of the side walls of the main body.

In addition, a second invention provides a wire harness protector configured by a main body and a lid closing an upper opening of the main body, the main body being provided with a branch wire insertion path continuous from a trunk wire insertion path, and the trunk wire insertion path and the branch wire insertion path having side walls standing from two ends of a bottom wall in a width direction. The wire harness protector includes a closing plate provided to close a middle of the branch wire insertion path, when a branch wire may be present to be inserted through the branch wire insertion path, the branch wire being branched from a trunk wire of a wire harness inserted through the trunk wire insertion path, the closing plate projecting from an inner surface on one of the side walls so as to pivot, via a thin-walled hinge; and when the branch wire is present in the branch wire insertion path, the branch wire can be inserted by rotating the closing plate toward the outlet to open the closing plate.

The closing plate is made of resin and can be molded integrally with the main body. Moreover, the closing plate is made of elastomer or rubber and may be formed in a two-color molding between the closing plate and the main body.

When the branch wire is not passed through the closing plate, in order to keep the closing plate in a closed position, a front end of the closing plate is formed in an arc shape and a hemispherical recess for fitting is provided to the inner surface of the side wall and the front end of the closing plate is preferably fitted onto the hemispherical recess. With the above-configuration, when the closing plate is pressed while the branch wire is inserted, the front end of the closing plate is smoothly detached from the hemispherical recess and can be rotated to an open position, and the closing plate can hold in position at the closed position when there is no branch wire.

In the trunk wire insertion path of the protector, the trunk wire of the wire harness is inserted from the upper opening of the main body. However, in the branch wire insertion path, the branch wire is inserted such that the closing plate is rotated toward an open direction from the trunk wire insertion path, as described above. The inserting operation of the branch wire dose not disturb operability as the branch wire insertion path is relatively short. Alternatively, when the branch wire is inserted into the branch wire insertion path, a worker may insert the branch wire from above into the branch wire insertion path in a state where the closing plate is rotated in the open position.

Effect of the Invention

In the wire harness protector of the present invention, depending on vehicle type and class, a branch wire branched from the trunk wire of the wire harness routed in the vehicles may or may not exist. When the closing plate is provided to the main body of the branch wire insertion path of the wire harness protector, the closing plate closes the branch wire insertion path when there is no branch wire and water and foreign matter can be prevented from entering the outlet. In addition, when the branch wire is present, the closing plate is bent by the branch wire and the branch wire insertion path opens to allow the branch wire to be passed. Therefore, there is no need to provide separate protectors based on the presence of the branch wire, which allows the number of components to be reduced.

BRIEF DESCRIPTION OF THE DRAWINGS

FIGS. 1 (A) and 1 (B) illustrate a protector of Embodiment 1 according to the present invention, where FIG. 1 (A) is an exploded perspective view of a main body and a lid and FIG. 1 (B) is a perspective view of a state where the main body and the lid are assembled.

FIGS. 2 (A) and 2 (B) illustrate a wire harness sheathed by the protector, where FIG. 2 (A) is a perspective view of the wire harness where a branch wire is branched from a trunk wire and FIG. 2 (B) is a perspective view of the wire harness where the branch wire is not branched from the trunk wire.

FIGS. 10 (A) and 10 (B) show another conventional example.

MODE FOR CARRYING OUT THE INVENTION

Figure 3A:
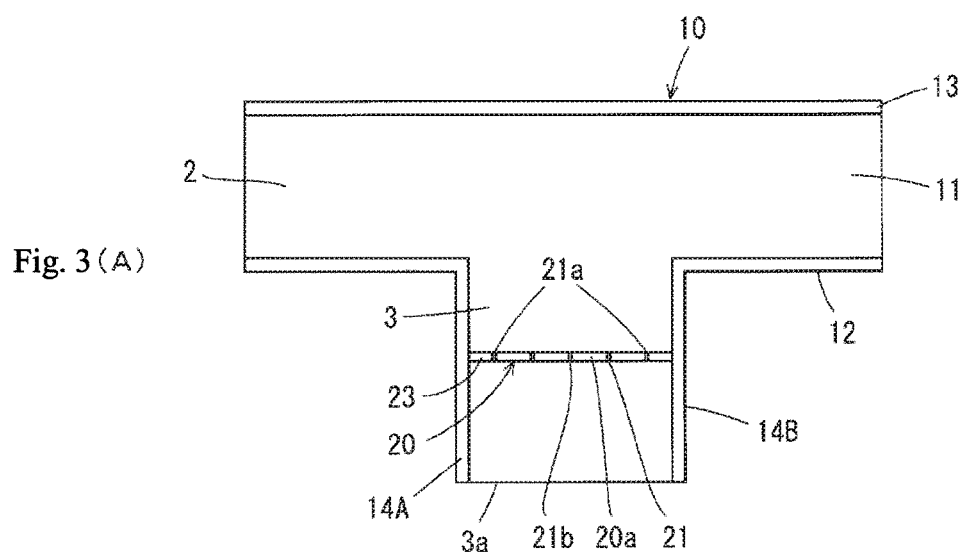
FIG. 3 (A) is a plan view of the main body of the protector, FIG. 3 (B) is a perspective view of a relevant portion, and FIG. 3 (C) is a perspective view illustrating a state where a closing plate is bent by the branch wire and the branch wire insertion path is open.

In the following, a wire harness protector of the present invention is described with reference to the drawings. FIGS. 1 (A) through 5 (B) illustrate Embodiment 1.

A wire harness protector 1 of Embodiment 1 includes a trunk wire insertion path 2 where a trunk wire 51 of a wire harness 50 is inserted as illustrated in FIG. 2 (A) and, contiguously, a branch wire insertion path 3 where a branch wire 52 passes through from one side of the trunk wire insertion path 2. In this example, the protector 1 can also sheathe a wire harness with no branch wire that branches off from the trunk wire 51 as illustrated in FIG. 2 (B). The protector 1 provided with the trunk wire insertion path 2 and the branch wire insertion path 3 is configured by a main body 10 and a lid 15 which are separate components. The trunk wire insertion path 2 of the main body 10 has a recessed shape in cross-section where side walls 12 and 13 stand from two ends of a bottom wall 11 in a width direction, and side walls 14A and 14B of the branch wire insertion path 3 are provided at an opening of a portion on the side wall 12 by bending two ends of the side wall 12.

After the wire harness 50 is passed through the main body 10, an upper opening of the main body 10 is covered and closed by the lid 15, then locked and joined as shown in FIG. 1 (B). In other words, a lock claw (not illustrated in the drawings) provided to circumferential walls 16 of the lid 15 is inserted and engaged to a lock frame (not illustrated in the drawings) provided to both side walls 12 and 13 of the main body 10, and is thereby locked and joined.

The branch wire 52 passing through the branch wire insertion path 3 is provided to a high grade vehicle, but not to a low grade vehicle. Accordingly, there are cases where the branch wire 52 is passed through the branch wire insertion path 3 and cases where this is not done. The closing plate 20 which opens/closes the branch wire insertion path 3 is provided in order to handle the presence or absence of the second branch wire 52. The position where the closing plate 20 is provided is located near an outlet 3a at a front end of the branch wire insertion path 3 and is enclosed by the bottom wall 11 and two side walls 14A and 14B.

The closing plate is formed by an elastic material made of elastomer and provided in a two-color molding between the closing plate and the main body 10 made of resin. The closing plate 20 is a flat plate shape which closes and transverses the branch wire insertion path 3 and a bottom surface of the closing plate 20 is continuous from a front surface of the bottom wall 11. Both side surfaces are continuous from inner surfaces of the side walls 14A and 14B, and a top end surface 20a of the closing plate 20 is arranged on the same plane as top end surfaces of the both side walls 14A and 14B.

Figure 3B:
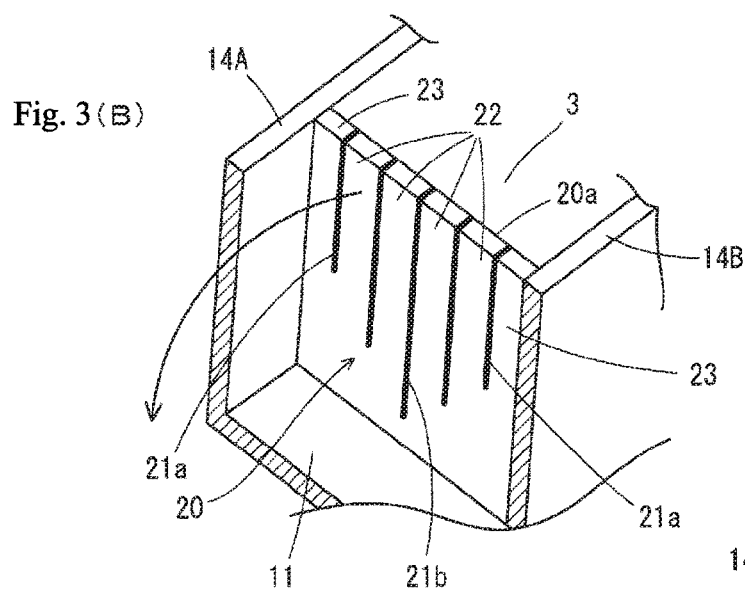
Figure 3C:
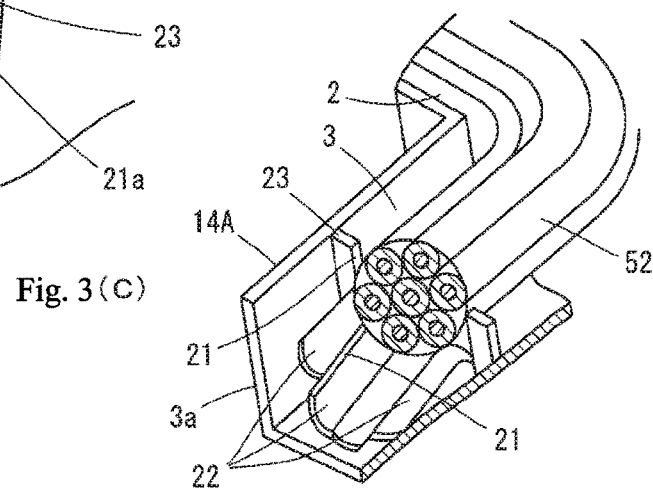

The closing plate 20 is provided with a plurality of strip-shaped divided pieces 22 by making a plurality of downward notches 21 from the top end surface 20a of the closing plate 20. The notches 21 are in a state where opposing surfaces of the divided pieces 22 are constantly in contact with a narrow width. The notches 21 are formed such that the length of notches 21a near the side walls 14A and 14B of two sides in the width direction are short, while the length of notches becomes gradually longer toward a center in the width direction, and a notch 21b in the center is the longest being almost the height of the bottom wall 11. In the present embodiment, as illustrated in FIG. 3 (B), five notches 21 and four divided pieces 22 are provided. Both end portions 23 of the closing plate 20 in the width direction are continuously molded with the both side walls 14A and 14B, and thereby do not bend.

As illustrated in FIG. 3 (B) and FIG. 1 (A), the closing plate 20 is formed in a state where the branch wire insertion path 3 is closed, and in this state, the opposing surfaces of the adjacent divided pieces 22 with the notches 21 therebetween are in contact, which allows water exposure to be prevented. On the other hand, when the branch wire 52 is pressed in from above, as illustrated in FIG. 3 (C), the divided pieces 22 of the closing plate 20 are bent at a lower end position of the notches 21 as bending start points in an arc shape along outer shape of the branch wire 52 in a circular shape in cross-section.

Figure 4A:
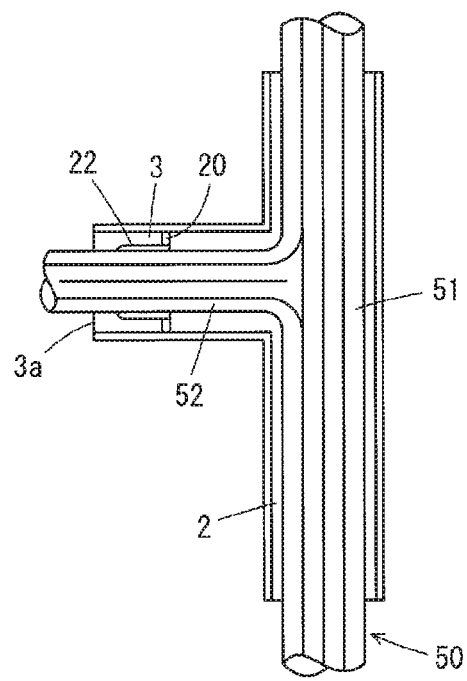
FIGS. 4 (A) and 4 (B) illustrate a case where the wire harness having the branch wire is inserted into the protector, where FIG. 4 (A) is a plan view of a state where the wire harness is passed through the main body and FIG. 4 (B) is a perspective view of a state where the wire harness is sheathed by the protector.
Figure 4B:
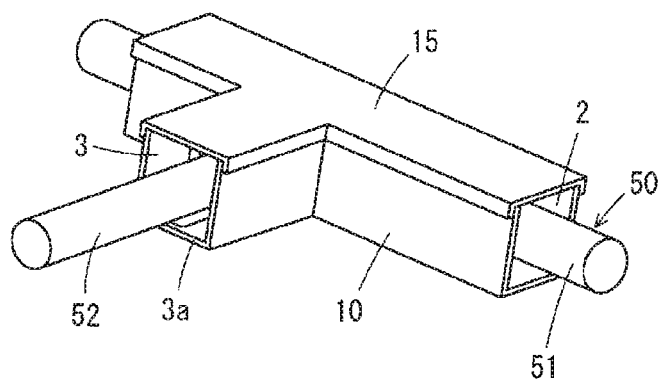

When the above-configured protector 1 is used, in a case where the branch wire 52 is branched off from the trunk wire 51 of the wire harness 50, the trunk wire 51 passes through the trunk wire insertion path 2 of the main body 10 and the branch wire 52 passes through the branch wire insertion path 3, as illustrated in FIG. 4 (A). The trunk wire 51 and the branch wire 52 are inserted into the main body 10 from the upper opening of the main body 10.

When the branch wire 52 is inserted into the branch wire insertion path 3 from the upper opening, the bottom surface of the branch wire 52 comes into contact with the top end surface of the closing plate 20. In this state, when the branch wire 52 is firmly pressed down, the closing plate 20 is bent as illustrated in FIG. 3 (C) as the branch wire 52 is pressed down, the divided pieces 22 of the closing plate 20 being bent at the lower end position of the notches 21 as the bending start points. Then, the branch wire 52 is inserted into the branch wire insertion path 3. In this state, the main body 10 and the lid 15 are locked and joined together by covering the main body 10 with the lid 15. The bent divided pieces 22 of the closing plate 20 are pushed upwardly by elastic force, however, with control of lock-joined lid 15, the branch wire 52 is held without rattling between the lid 15 and the bent divided pieces 22.

Figure 5A:
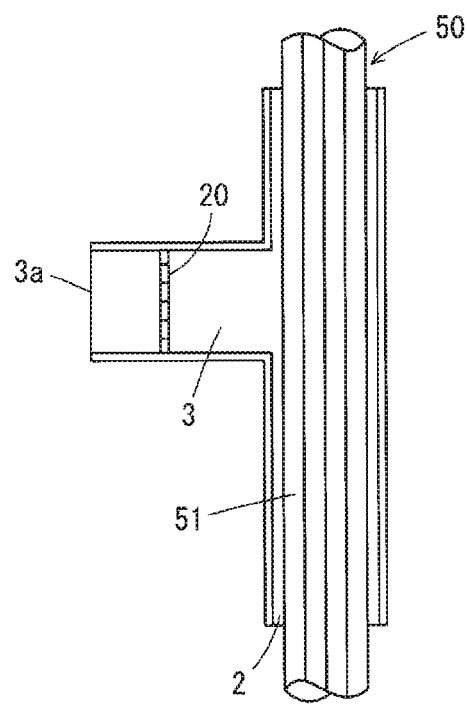
FIGS. 5 (A) and 5 (B) illustrate a case where the wire harness with no branch wire is inserted into the protector, where FIG. 5 (A) is a plan view of a state where the wire harness is passed through the main body and FIG. 5 (B) is a perspective view of a state where the wire harness is sheathed by the protector.
Figure 5B:
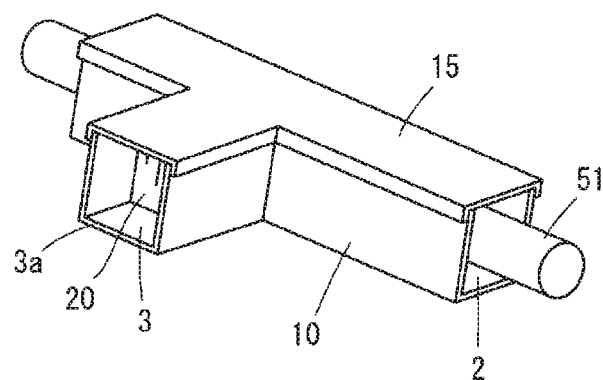
Figure 6A:
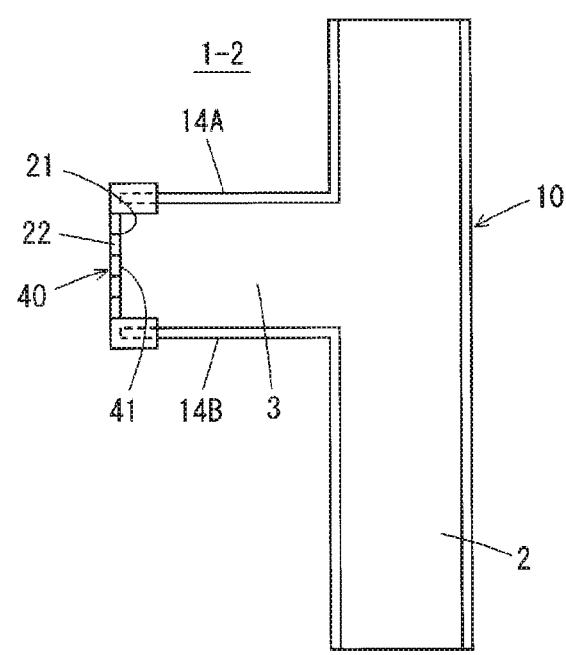
FIGS. 6 (A) through 6 (D) illustrate a protector of Embodiment 2, where FIG. 6 (A) is a plan view of a main body of a protector, FIG. 6 (B) is a perspective view of a closing plate cap, FIG. 6 (C) is a cross-sectional view along a line C-C of FIG. 6 (B), and FIG. 6 (D) is an explanatory diagram of a state where a branch wire is inserted.
Figure 6B:
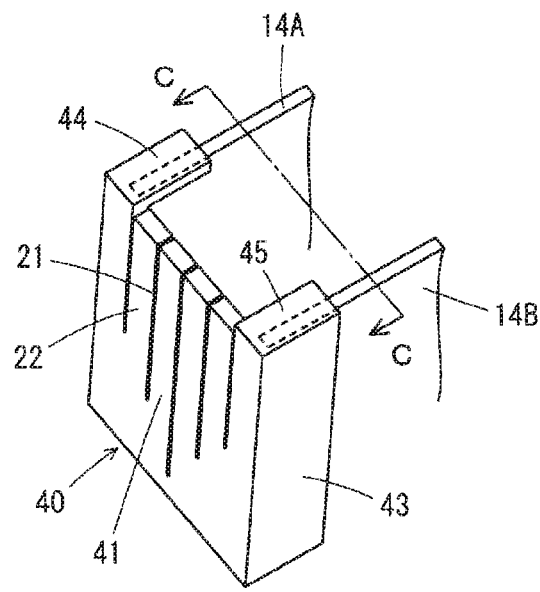
Figure 6D:
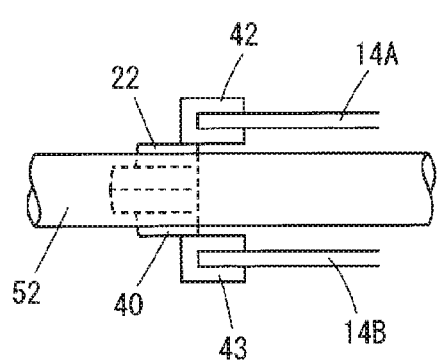
Figure 6C:
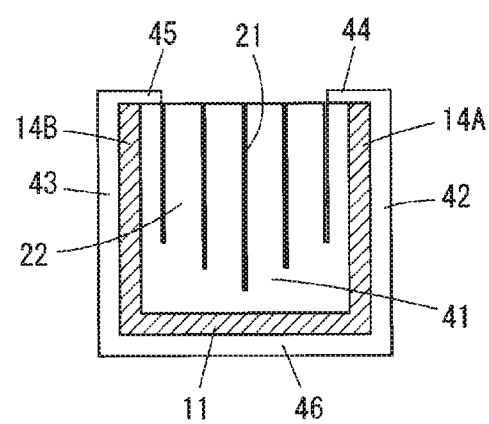

On the other hand, when the wire harness 50 is configured only with the trunk wire 51 as illustrated in FIG. 2 (B) and has no branch wire, there is no branch wire in the branch wire insertion path 3 of the main body 10 of the protector 1 as illustrated in FIG. 5 (A). Therefore, the branch wire insertion path 3 is closed in the middle by the closing plate 20. The closing plate 20 has notches 21, however, both end surfaces of the adjacent divided pieces 22 are in contact and the bottom end portion of the closing plate 20 has no notches 21 and is contiguous. Therefore, water entering an outlet 3a of the branch wire insertion path 3 and running along the bottom wall surface is blocked by the closing plate 20 and flooding the trunk wire insertion path 2 can be prevented. In addition, the closing plate 20 can block entry of foreign matter into the outlet 3a and therefore, an adverse effect on the wire harness 50 inserted inside the protector 1 can be prevented.

FIGS. 6 (A) to 6 (D) illustrate a protector 1-2 of Embodiment 2. In the protector 1-2, a closing plate 40 blocking the branch wire insertion path 3 is separately formed in a cap-shape made of elastomer and is retrofitted to the outlet 3a of the branch wire insertion path 3.

The cap-shaped closing plate 40 is molded with the elastomer and is formed substantially in a U-shape in a horizontal cross-section as illustrated in FIGS. 6. (B) and 6 (C). The closing plate 40 is configured by a front portion 41 blocking the outlet 3a of the branch wire insertion path 3, side portions 42 and 43 bending from both sides of the front portion 41, upper portions 44 and 45 on both sides which bend from top end of the side portions 42 and 43, and a bottom portion 46 covering the bottom surface of the bottom wall 11. The side portions 42 and 43 cover outer sides toward the outlet of the side walls 14A and 14B, and the upper end surfaces of the side walls 14A and 14B are covered with the upper portions 44 and 45. The cap-shaped closing plate 40 is formed as mentioned above, and the outlet 3a of the branch wire insertion path 3 is externally mounted and held. On the front portion 41 of the closing plate 40 is provided with divided pieces 22 with notches 21 similar to Embodiment 1. Other configurations are similar to Embodiment 1 and are given identical reference numerals and descriptions thereof are omitted.

Operations of the protector 1-2 of the Embodiment 2 are similar to that of Embodiment 1, and when the wire inserted into the wire harness has a branch wire, the branch wire 52 is passed through the branch wire insertion path 3 and by pushing the branch wire 52 from above, the divided pieces 22 of the closing plate 40 are bent to pass the branch wire as illustrated in FIG. 6 (D). On the other hand, when there is no branch wire, the closing plate 40 blocks the outlet 3a and therefore, water exposure and entry of foreign matter can be prevented. Moreover, the closing plate 40 is formed in a cap-shape which is retrofitted. Therefore, when the wire harness is passed into the main body of the protector, the closing plate 40 may not be attached and the closing plate 40 may cover the outlet of the branch wire insertion path 3 when there is no branch wire.

Figure 7A:
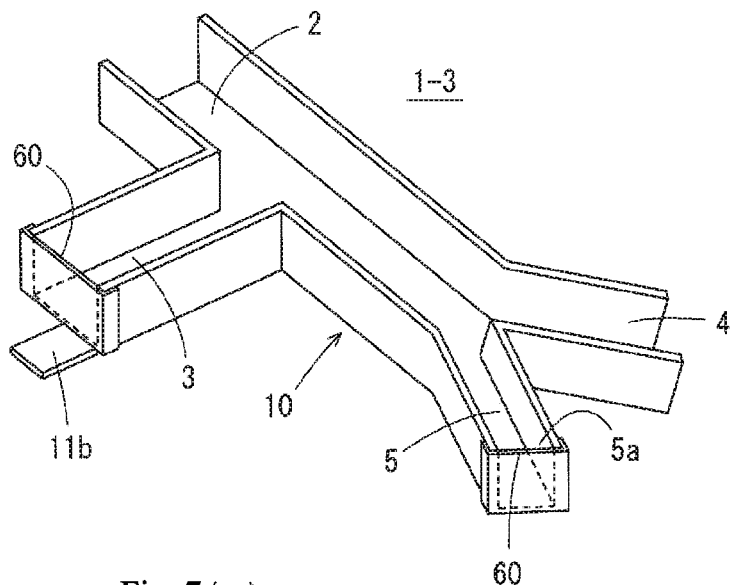
FIGS. 7 (A) through 7 (C) illustrate a protector of Embodiment 3, where FIG. 7 (A) is a perspective view of a main body, FIG. 7 (B) is an enlarged view of a relevant portion, and FIG. 7 (C) is an explanatory diagram illustrating an operation when a branch wire is inserted.
Figure 7B:
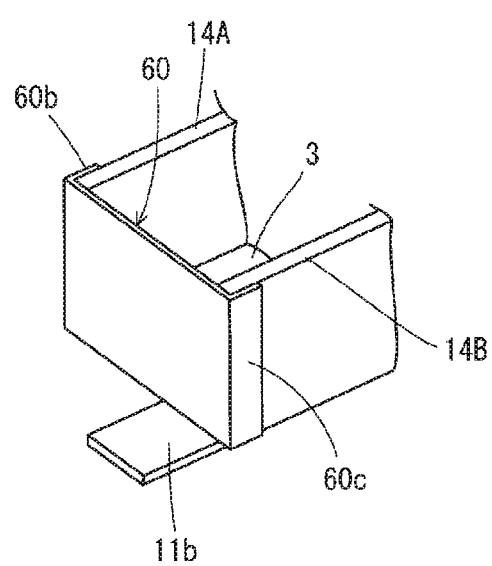
Figure 7C:
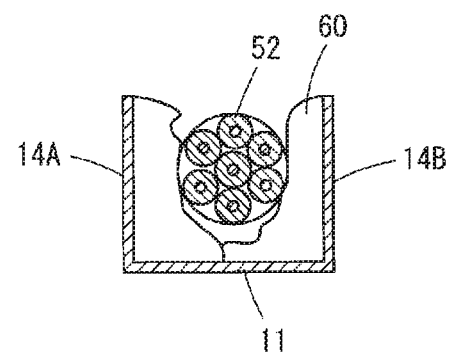

FIGS. 7 (A) to 7 (C) illustrate a protector 1-3 of Embodiment 3. The main body 10 of the protector 1-3 is provided with a second branch wire insertion path 4 and a third branch wire insertion path 5 by branching the outlet side of the trunk wire insertion path 2 into two and includes three branch wire insertion paths including the first branch wire insertion path 3 which is provided in the middle of the trunk wire insertion path 2. The branch wire must be passed into the second branch wire insertion path 4, however, the branch wire may sometimes not be passed into the first branch wire insertion path 3 and the third branch wire insertion path 5 depending on vehicle type and class. Accordingly, closing plates 60 and 60 blocking the first branch wire insertion path 3 and outlet 5a of the third branch wire insertion path 5 are retrofitted. Further, 11b in the drawing is a winding piece of a tape projected from the bottom wall of the outlet 3a.

The closing plate 60 blocking outlets 3a and 5a is formed by a widely-used resin film such as vinyl chloride wrap and polyethylene wrap which is thin, easy to be torn, and vulnerable. As illustrated in FIGS. 7 (A) and 7 (B), the resin film is covered so as to block the outlets 3a and 5a of the branch wire insertion paths 3 and 5, and two side portions 60b and 60c are bent and wrapped on the outer sides of the both side walls 14A and 14B. The resin film is bonded and fixed to the outer side of both side walls 14a and 14B by an adhesive applied in advance.

When the branch wire 52 is inserted into the branch wire insertion path 3, the branch wire 52 is pressed down from above to the closing plate 60. As illustrated in FIG. 7 (C), the closing plate 60 is torn while stretching to pass the branch wire 52. Similarly, for a case where the branch wire is passed into the third branch wire insertion path 5, the branch wire is inserted by tearing the closing plate 60.

The resin film forming the closing plate 60 does not become torn unless shocking pressure is applied, and therefore, when no branch wire is inserted, water exposure and entry of foreign matter can be prevented. In addition, an inexpensive widely-used resin film can be used for the closing plate 60, and therefore manufacturing cost can be reduced. Moreover, similar to the closing plate 40 of Embodiment 2, the closing plate 60 having the resin film bonded to the outlet may not be attached when the wire harness is passed into the main body of the protector. When there is no branch wire, the closing plate 60 may be attached to the outlet of the branch wire insertion path.

Figure 8A:
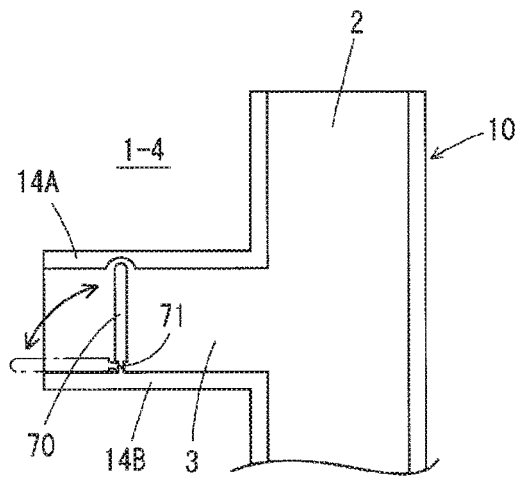
FIG. 8 illustrates FIGS. 8 (A) through 8 (C) illustrate a protector of Embodiment 4, where FIG. 8 (A) is a plan view of a main body and FIG. 8 (B) and FIG. 8 (C) are explanatory diagrams of a relevant portion.
Figure 8B:
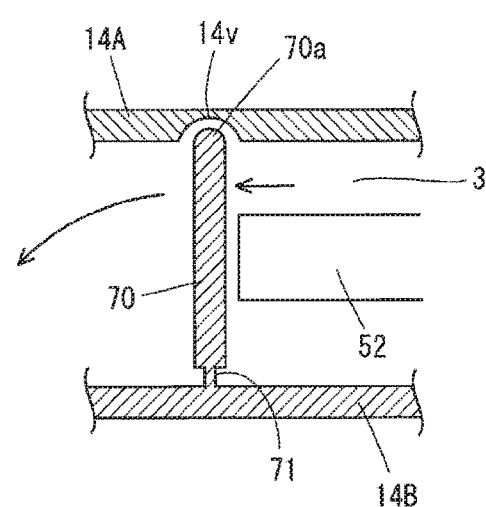
Figure 8C:
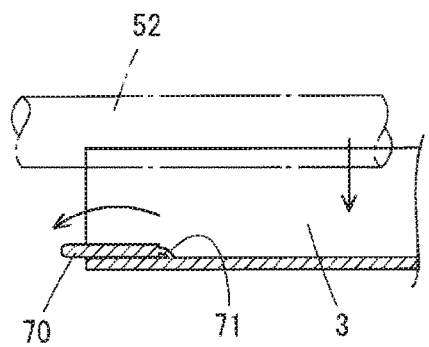
Figure 9A:
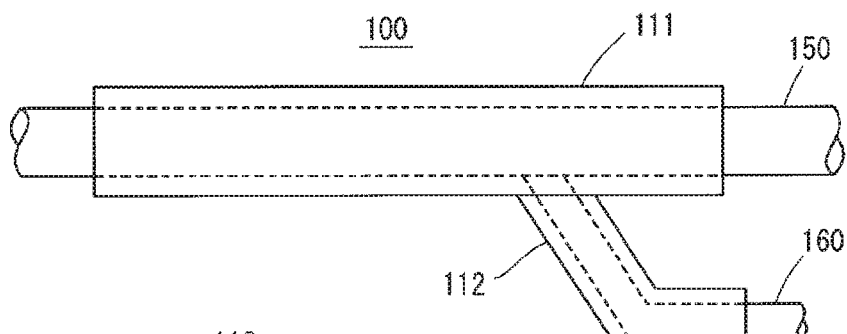
FIGS. 9 (A) and 9 (B) show a conventional example.
Figure 9B:
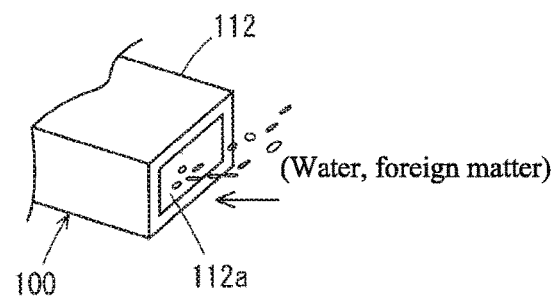

FIGS. 8 (A) to 8 (C) illustrate a protector 1-4 of Embodiment 4. As illustrated in FIG. 8 (A), the protector 1-4 is configured with a closing plate 70 projecting from an inner surface of one side wall 14B so as to pivot, via a thin-walled hinge 71, in the middle of the branch wire insertion path 3 branched from the trunk wire insertion path 2. The closing plate 70 and the thin-walled hinge 71 are integrally molded with the main body 10, and therefore, the closing plate 70 is made of the resin. Furthermore, similar to Embodiment 1, the closing plate may be made of elastomer and provided in two-color molding.

The closing plate 70 is a rectangular plate in a flat plate shape which has a size to close and transverse the branch wire insertion path 3. A front edge 70a on the projecting side is in a circular arced shape and a hemispherical recess 14v is provided on an inner surface of the side wall 14A at the position opposite from the front edge 70a. The front edge 70a is fitted and engaged with the hemispherical recess 14v. The branch wire insertion path 3 is closed with the closing plate 70 in the fitted and engaged state as illustrated in FIG. 8 (B), when the branch wire is not inserted into the branch wire insertion path 3, water exposure and entry of foreign matter is prevented.

Meanwhile, when the branch wire 52 is passed into the branch wire insertion path 3, the closing plate 70 is rotated around the thin-walled hinge 71 as a fulcrum as illustrated in FIG. 8 (C), and openly positioned in a horizontal direction along the side wall 14B to allow the branch wire 52 to be inserted from above. At this time, the front edge 70a of the closing plate 70 is in the circular arced shape and is engaged with the hemispherical recess 14v, and therefore, the front edge 70a is rotated to be smoothly detached from the hemispherical recess 14v to allow rotation. The rotating operation of the closing plate 70 to the open position can be performed easily by a worker in advance or at the same time when the branch wire 52 is inserted into the branch wire insertion path 3.

Further, as illustrated in FIG. 8 (B), when the branch wire 52 is inserted from the trunk wire side into which the branch wire 52 is inserted, with the insertion force of the branch wire indicated by the arrows in the drawing, the closing plate 70 is rotated to the open position and allows the branch wire 52 to be passed.

DESCRIPTION OF REFERENCE NUMERAL

1 Protector
2 Trunk wire insertion path
3 Branch wire insertion path
10 Main body
15 Lid
20 Closing plate
21 Notch
22 Divided piece
50 Wire harness
51 Trunk wire
52 Branch wire

The invention claimed is:

1. A wire harness protector having a main body and a lid closing an upper opening of the main body, the main body including a branch wire insertion path continuous from a trunk wire insertion path, the trunk wire insertion path and the branch wire insertion path having side walls standing from two ends of a bottom wall in a width direction, the wire harness protector comprising:

a closing plate provided integrally with the main body or retrofitted separately, wherein a branch wire may be inserted through the branch wire insertion path, the branch wire being branched from a trunk wire of a wire harness inserted through the trunk wire insertion path, the closing plate closing a middle or an outlet of the branch wire insertion path, wherein the closing plate is pressed by the branch wire being inserted and is configured with elasticity to be folded down or vulnerability to be torn, the closing plate having a flat plate shape and including a plurality of strip-shaped pieces separated by a plurality of notches extending downward from a top end of the closing plate, such that when the strip-shaped pieces divided by the notches are pressed down from above by the branch wire, each of the divided pieces is bent down from a base to enable the branch wire to be inserted.

2. The wire harness protector according to claim 1, wherein the closing plate is a rectangular flat plate that can fully close and transverse the branch wire insertion path.

3. A wire harness protector having a main body and a lid closing an upper opening of the main body, the main body including a branch wire insertion path continuous from a trunk wire insertion path, the trunk wire insertion path and the branch wire insertion path having side walls standing from two ends of a bottom wall in a width direction, the wire harness protector comprising:

a closing plate provided integrally with the main body or retrofitted separately, wherein a branch wire may be inserted through the branch wire insertion path, the branch wire being branched from a trunk wire of a wire harness inserted through the trunk wire insertion path, the closing plate closing an outlet of the branch wire insertion path, wherein the closing plate is pressed by the branch wire being inserted and is configured with elasticity to be folded down or vulnerability to be torn, wherein the main body and the lid are made of resin, the closing plate is made of elastomer or rubber, the closing plate is formed by a two-color molding, and the closing plate is retrofitted to the outlet of the branch wire insertion path and is formed in a cap shape and externally mounted onto the outlet.

4. A wire harness protector having a main body and a lid closing an upper opening of the main body, the main body including a branch wire insertion path continuous from a trunk wire insertion path, the trunk wire insertion path and the branch wire insertion path having side walls standing from two ends of a bottom wall in a width direction, the wire harness protector comprising:

a closing plate provided integrally with the main body or retrofitted separately, wherein a branch wire may be inserted through the branch wire insertion path, the branch wire being branched from a trunk wire of a wire harness inserted through the trunk wire insertion path, the closing plate closing an outlet of the branch wire insertion path, wherein the closing plate is pressed by the branch wire being inserted and is configured with elasticity to be folded down or vulnerability to be torn, wherein the closing plate is formed by a resin film, the resin film covering the outlet of the branch wire insertion path so as to close the outlet, the resin film being bent and bonded onto external surfaces of both side walls.

5. A wire harness protector having a main body and a lid closing an upper opening of the main body, the main body including a branch wire insertion path continuous from a trunk wire insertion path, and the trunk wire insertion path and the branch wire insertion path having side walls standing from two ends of a bottom wall in a width direction, the wire harness protector comprising:

a closing plate configured to close a middle of the branch wire insertion path, wherein a branch wire may be inserted through the branch wire insertion path, the branch wire being branched from a trunk wire of a wire harness inserted through the trunk wire insertion path, the closing plate projecting from an inner surface of one of the side walls so as to pivot, via a thin-walled hinge, wherein when the branch wire is inserted in the branch wire insertion path, the branch wire is allowed to be inserted by rotating the closing plate toward an outlet to open the closing plate.

6. The wire harness protector according to claim 2, wherein lengths of the notches nearer the side walls are shorter than the lengths of the notches farther from the side walls.

7. The wire harness protector according to claim 6, wherein the lengths of the notches becomes gradually longer from edges of the closing plate toward a center of the closing plate in a width direction, and a notch in the center of the closing plate is a longest notch.

* * * * *